United States Patent
Rothamel et al.

(10) Patent No.: US 6,390,074 B1
(45) Date of Patent: May 21, 2002

(54) FUEL ASSEMBLY

(75) Inventors: David H. Rothamel, Chelsea; Robert H. Thompson, Redford, both of MI (US)

(73) Assignee: Ford GLobal Technologies, Inc., Dearborn, MI (US)

( * ) Notice: Subject to any disclaimer, the term of this patent is extended or adjusted under 35 U.S.C. 154(b) by 0 days.

(21) Appl. No.: 09/571,120

(22) Filed: May 12, 2000

(51) Int. Cl.[7] ............................................. F02M 33/02
(52) U.S. Cl. ........................................ 123/519; 123/518
(58) Field of Search ................................ 123/518, 519, 123/520, 509, 527, 516; 220/746

(56) References Cited

U.S. PATENT DOCUMENTS 3,372,679 A * 3/1968 Aitken ........................ 123/520
3,910,302 A * 10/1975 Sudhir .......................... 137/43
4,683,862 A * 8/1987 Fornuto et al. ............. 123/520
4,852,761 A    8/1989 Turner et al. ................ 220/746
4,919,103 A * 4/1990 Ishiguro et al. ............. 123/514
5,058,693 A   10/1991 Murdock et al. ........... 180/69.4
6,016,827 A * 1/2000 Dawson ....................... 137/202
6,182,693 B1 * 2/2001 Stack et al. ............ 137/565.17

FOREIGN PATENT DOCUMENTS

JP          55-161952     12/1980
JP          64-347         1/1989

* cited by examiner

*Primary Examiner*—Willis R. Wolfe
*Assistant Examiner*—Mahmoud Gimie
(74) *Attorney, Agent, or Firm*—Ford Global Tech. Inc.

(57) ABSTRACT

A fuel assembly 10 which selectively receives volatile fuel 26 and which communicates the vapors to a carbon canister 42 for treatment prior to being released into the atmosphere or environment 38. The canister 42 is coupled to the fuel 26 by the use of various valves 30, 32, transducer 34, and conduits 35, 39, which are sealed from the environment 38.

21 Claims, 1 Drawing Sheet

FUEL ASSEMBLY

FIELD OF THE INVENTION

The present invention generally relates to a fuel assembly and more particularly, to a vehicular fuel assembly which is adapted to receive, store, and selectively transport fuel to an engine.

BACKGROUND OF THE INVENTION

Vehicular fuel assemblies are adapted to selectively receive and store fuel for use within and/or by an engine (i.e., an internal combustion type engine), effective to allow a vehicle to be desirably driven and maneuvered.

Conventionally, these assemblies include a tank into which volatile or vaporific fuel is selectively placed and several devices and/or components (i.e., a treatment canister) which are externally deployed from the tank and which are communicatively coupled to the tank. These devices and/or components cooperatively allow the fuel vapors to be selectively purged from the tank, treated, and controllably released into the ambient environment or atmosphere, effective to selectively and desirably reduce pressure within the tank, to allow the vapors emanating from currently received fuel to be treated, and to reduce the amount of undesirable constituents present within one or more of the devices and/or components.

While these prior or conventional fuel assemblies do desirably receive and store fuel, they suffer from some drawbacks. For example, some of the fuel vapors may undesirably escape from the externally deployed and previously delineated devices and components and/or from the conduits which couple these devices and/or components to the tank, thereby being released into the atmosphere. Moreover, some of the undesirable constituents that are extracted from the fuel may also be released into the atmosphere due to leaks within the treatment components or devices. The present invention addresses these drawbacks while concomitantly allowing fuel to be temporarily stored and communicated to an engine in an efficient and desired manner.

SUMMARY OF THE INVENTION

It is a first object of the present invention to provide a fuel assembly which overcomes at least some of the previously delineated drawbacks of prior fuel assemblies.

It is a second object of the present invention to provide a fuel assembly which overcomes at least some of the previously delineated drawbacks of prior fuel assemblies and which, by way of example and without limitation, reduces the likelihood of undesirable fuel emission.

According to a first aspect of the present invention, a fuel assembly is provided. The fuel assembly includes a first portion which selectively receives fuel; a second sealed portion; and a treatment member which is deployed within the second sealed portion and which communicates with the fuel.

According to a second aspect of the present invention, a method for receiving and storing fuel is provided. The method comprises the steps of providing a storage receptacle; creating a first sealed portion within the storage receptacle; creating a second sealed portion within the storage receptacle; placing fuel within the first sealed portion; and communicating the fuel to the second sealed portion.

These and other aspects, features, and embodiments of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
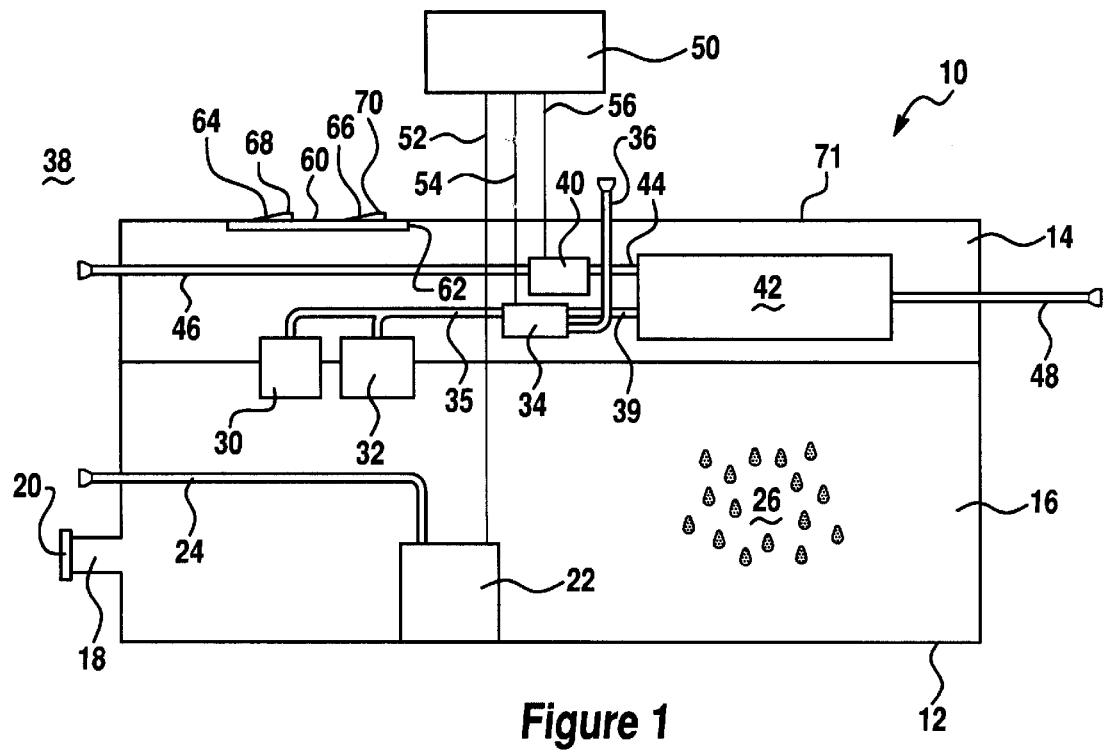
FIG. 1 is a side view of a fuel assembly which is made in accordance with the teachings of the preferred embodiment of the invention.
Figure 2:
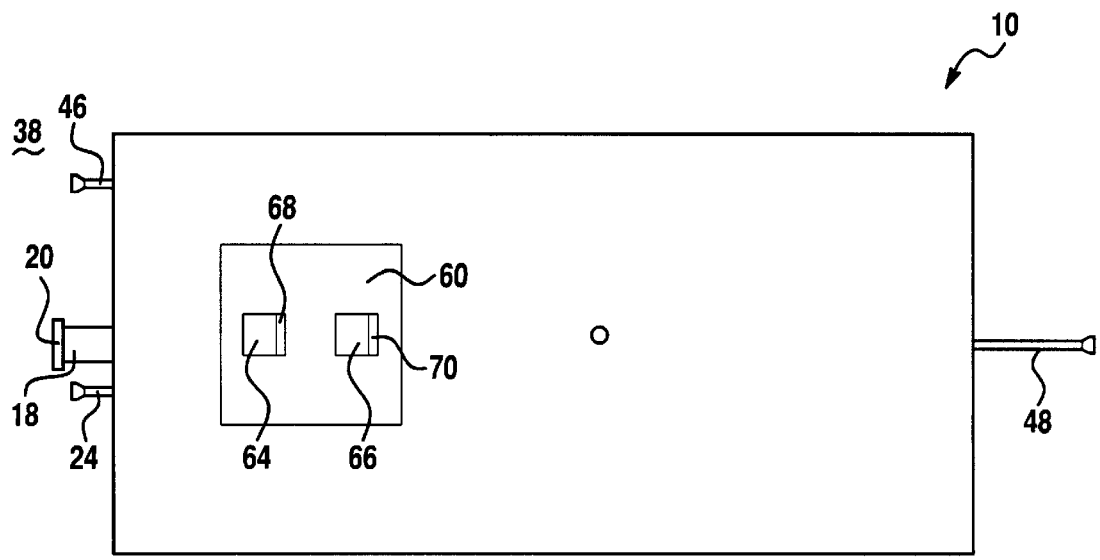
FIG. 2 is a top view of the fuel assembly, which is shown in FIG. 1.

Referring now to FIGS. 1 and 2, there is shown a fuel assembly 10 which is made in accordance with the teachings of the preferred embodiment of the invention. As shown, fuel assembly 10 includes a container, receptacle, or tank 12 having a first sealed portion 14 and a second sealed portion 16. As used in this Application, the term "sealed" means that these portions 14, 16 do not substantially communicate fuel vapors or other undesirable materials or constituents into the ambient environment 38.

Further, as shown, portion 16 includes a first orifice 18 upon which a conventional fuel cap 20 is selectively and removably placed. Particularly, fuel cap 20 is selectively movable from a first position in which cap 20 overlays and closes orifice 18 (i.e., substantially prevents communication between ambient environment or atmosphere 38 and portion 16) to a second position which allows portion 16 to receive fuel 26, thereby allowing the received fuel 26 to be selectively transported into portion 16 through the orifice 18. A fuel delivery module or pump assembly 22 is operatively disposed within the sealed portion 16 and is physically and operatively coupled to the fuel supply line 24, effective to selectively cause the contained fuel 26 to forcibly enter the line or conduit 24 and travel to the vehicle engine (not shown). Assembly 22 may include a conventional fuel level sensor which may be used to determine the amount of fuel 26 remaining within the portion 16.

Assembly 10 further includes a pair of valves 30, 32 which are each respectively disposed within sealed portions 14 and 16 and which are each physically and communicatively coupled to a pressure transducer 34 by use of conduit or line 35. Moreover, transducer 34 is communicatively coupled, by conduit or line 36, to the ambient environment 38 and by line or conduit 39 to a carbon canister or "treatment" device or component 42. Assembly 10 also includes a third or "vapor management" valve 40 which is physically coupled to the carbon canister assembly 42 and to the vehicle engine by respective conduits or lines 44, 46. Carbon canister 42 is physically and communicatively coupled to the ambient environment 38 by use of conduit or line 48. Module 22, valve 40, and transducer 34 are electrically and physically connected to a main control module 50, by use of respective electrical busses 52, 54, and 56. In one non-limiting embodiment of the invention, main control module 50 is externally deployed from portions 14 and 16 of the fuel tank assembly 10. In one non-limiting embodiment of the invention, a sealing type compound (e.g., silicon) is applied to the exterior of assembly 10 and around the protruding wires or busses 52, 54, and 56 to substantially prevent communication between the atmosphere or ambient environment 38 and the portion 14. A similar compound may be applied around conduits or lines 46, 48, and 24 to similarly prevent undesirable communication between portions 14, 16 and the environment 38.

In operation, as fuel 26 enters portion 16, the vapors are communicated to the carbon canister or treatment member 42 by the valve 32 and by conduits 35, 39 and transducer 34, thereby allowing the fuel vapors to be treated or "cleansed" of substantially undesirable constituents before being delivered, by conduit or line 48, into the ambient environment 38. Similarly, valve 30 allows vapors, resident within portion 16, to be transported to the canister 42 by use of conduits 35, 39, and transducer 34, thereby reducing the pressure within portion 16. Hence, carbon canister or component 42 substantially prevents the communication of fuel vapor and other undesirable constituents from portion 14 to the ambient environment or atmosphere 38. Transducer 34 "reports" or provides, to controller 50, the pressure resident within the portion 16 in order to allow certain pressure or leakage tests to be conducted. Further, controller 50, by use of bus 56, selectively activates the valve 40, effective to cause the previously extracted and temporally stored undesired constituents, resident within canister 42, to be communicated to the engine (not shown) or "purged" by use of conduits 44 and 46. Hence, portions 14 and 16 are sealed from the ambient environment 38. That is, only treated type emissions may emanate from portion 14 to the ambient environment 38 and substantially no undesirable emissions may be communicated from portion 16 to the ambient environment 38 once the cap 20 has been placed upon member 18. Controller 50, by use of bus 52, activates pump assembly 22, effective to cause assembly 22 to draw, pump, or transport at least a portion of the stored fuel 26 to the vehicle engine (not shown) by use of conduit or line 24, thereby allowing the vehicle to be desirably driven.

It should be realized that in the foregoing fuel tank assembly 10, valve 40; transducer 34; and conduits or lines 35, 39, and 44 are wholly contained and operatively disposed within a substantially sealed environment or portion 14 in which communication of the volatile fuel 26 with the environment 38 is substantially prevented. Further, as previously delineated, once cap 20 is selectively placed upon orifice 18, communication between portion 16 and the ambient environment or atmosphere 38 is substantially prevented. Hence, both portions 14 and 16 are operatively sealed. In this manner, the likelihood of undesirable fuel vapor emission into the atmosphere or ambient environment 38 is substantially reduced and/or eliminated. That is, even if components 34, 40, or lines 35, 46, 39, and 44, assembly 22, and/or valves 30, 32 begin to undesirably leak, such leakage is "contained" within the sealed portions 14, 16 and the emission of fuel vapors or other undesirable constituents to the atmosphere 38 is substantially prevented from occurring.

In a non-limiting embodiment of the invention, as best shown in FIGS. 1 and 2, fuel tank assembly 10 further includes a removable top portion or service cap 60 which is movable from a first closed position in which cap 60 overlays an opening 62 formed upon the surface 71 and substantially prevents communication between ambient environment 38 and portion 14 through opening 62, to a second position in which the cap 60 is selectively removed to allow access to the portion 14, thereby allowing service, repair, or inspection of the various components and/or conduits 30, 32, 34, 35, 36, 39, 40, 42, 44, and 46 included within portion 14.

Particularly, cap 60 is generally rectangular and includes a pair of substantially identical openings 64, 66 which selectively and respectively receive a unique one of the deformable tabs 68, 70 which are resiliently disposed upon surface face 71, thereby allowing the cap 60 to be selectively secured over opening 62 and upon the surface 71 of the assembly 10.

It should be understood that the invention is not limited to the exact embodiment or construction which has been illustrated and discussed above, but that various changes and modifications may be made without departing from the spirit and the scope of the invention as is set forth in the following claims.

What is claimed is:

1. A fuel assembly of the type having a treatment member and at least one conduit which transports fuel vapors to the treatment member, said fuel tank assembly comprising:
   a portion which is wholly contained within said fuel tank assembly and which seals said at least one conduit from the atmosphere.

2. The fuel tank assembly of claim 1 wherein said portion comprises a chamber.

3. The fuel tank assembly of claim 2 further comprising a member which is removably attached to said chamber.

4. A fuel tank assembly comprising:
   a first sealed portion;
   a second sealed portion;
   a treatment member disposed within said first sealed portion; and
   a transport assembly which is wholly contained within said fuel tank assembly and which communicatively couples said treatment member to said second sealed portion.

5. The fuel tank assembly of claim 4 wherein said transport assembly comprises at least one valve; and a conduit.

6. The fuel tank assembly of claim 4 wherein said treatment member comprises a carbon canister.

7. The fuel tank assembly of claim 4 wherein said treatment member receives vapor from volatile fuel residing in said second sealed portion.

8. The fuel tank assembly of claim 4 further comprising a pump assembly which is disposed with said second sealed portion.

9. The fuel tank assembly of claim 4 further comprising a pressure transducer disposed within said first sealed portion.

10. The fuel tank assembly of claim 4 further comprising a conduit which couples said first sealed portion to an engine.

11. The fuel tank assembly of claim 4 further comprising a conduit which communicatively couples said treatment member to the atmosphere.

12. The fuel tank assembly of claim 4 wherein said fuel tank assembly further comprises a removably top.

13. The fuel tank assembly of claim 7 wherein said fuel tank assembly further comprises a second removable member which allows selective access to said second sealed portion.

14. A method for receiving and storing fuel comprising the steps of:
   providing a storage receptacle;
   creating a first sealed portion within the storage receptacle;
   creating a second sealed portion within the storage receptacle;
   placing a vaporific fuel within the first sealed portion;
   communicating the fuel vapors emanating from said received fuel to the first sealed portion, wherein said communicated fuel vapors are wholly retained within said storage receptacle; and
   communicating at least a portion of said vaporific fuel to a vehicle engine.

15. The method of claim 14 further comprising the step of:

placing a treatment member within said first sealed portion.

16. The method of claim 15 when said treatment member comprises a carbon canister.

17. The method of claim 15 further comprising the step of communicatively coupling said treatment member to the atmosphere.

18. The method of claim 14 further comprising the step of selectively allowing access to said first sealed portion.

19. The method of claim 14 further comprising the step of selectively allowing access to said second sealed portion.

20. The method of claim 14 further comprising the step of treating said vapors.

21. The method of claim 20 further comprising the step of communicatively coupling said treatment member to the atmosphere to permit said treated vapors to be delivered to the atmosphere.

* * * * *